(12) United States Patent
Bouaziz et al.

(10) Patent No.: US 11,068,698 B2
(45) Date of Patent: Jul. 20, 2021

(54) GENERATING ANIMATED THREE-DIMENSIONAL MODELS FROM CAPTURED IMAGES

(71) Applicant: Apple Inc., Cupertino, CA (US)

(72) Inventors: Sofien Bouaziz, Los Gatos, CA (US); Brian Amberg, Zurich (CH); Thibaut Weise, Menlo Park, CA (US); Patrick Snape, Zurich (CH); Stefan Brugger, Basel Land (CH); Alex Mansfield, Zurich (CH); Reinhard Knothe, Basel (CH); Thomas Kiser, Zurich (CH)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/586,758

(22) Filed: Sep. 27, 2019

(65) Prior Publication Data

US 2020/0125835 A1    Apr. 23, 2020

Related U.S. Application Data

(63) Continuation of application No. 15/934,521, filed on Mar. 23, 2018, now Pat. No. 10,430,642.
(Continued)

(51) Int. Cl.
*G06T 15/00* (2011.01)
*G06K 9/00* (2006.01)
*G06T 17/20* (2006.01)

(52) U.S. Cl.
CPC ..... *G06K 9/00281* (2013.01); *G06K 9/00261* (2013.01); *G06K 9/00315* (2013.01); *G06T 17/20* (2013.01)

(58) Field of Classification Search
CPC ............... G06T 17/20; G06K 9/00315; G06K 9/00281; G06K 9/00261
(Continued)

(56) References Cited

U.S. PATENT DOCUMENTS 7,755,619 B2   7/2010   Wang et al.
9,196,074 B1   11/2015  Bhat et al.
(Continued)

OTHER PUBLICATIONS

Cao C, Weng Y, Zhou S, Tong Y, Zhou K. Facewarehouse: A 3d facial expression database for visual computing. IEEE Transactions on Visualization and Computer Graphics. Nov. 4, 2013;20(3):413-25.*
(Continued)

*Primary Examiner* — Phu K Nguyen
(74) *Attorney, Agent, or Firm* — Kowert, Hood, Munyon, Rankin & Goetzel, P.C.; Gareth M. Sampson

(57) ABSTRACT

A three-dimensional model (e.g., motion capture model) of a user is generated from captured images or captured video of the user. A machine learning network may track poses and expressions of the user to generate and refine the three-dimensional model. Refinement of the three-dimensional model may provide more accurate tracking of the user's face. Refining of the three-dimensional model may include refining the determinations of poses and expressions at defined locations (e.g., eye corners and/or nose) in the three-dimensional model. The refining may occur in an iterative process. Tracking of the three-dimensional model over time (e.g., during video capture) may be used to generate an animated three-dimensional model (e.g., an animated puppet) of the user that simulates the user's poses and expressions.

20 Claims, 5 Drawing Sheets

Related U.S. Application Data

(60) Provisional application No. 62/595,920, filed on Dec. 7, 2017.

(58) Field of Classification Search
USPC .......................................................... 345/418
See application file for complete search history.

(56) References Cited

U.S. PATENT DOCUMENTS

| | | |
|---|---|---|
| 9,361,723 B2 | 6/2016 | Zhou et al. |
| 9,734,617 B2 | 8/2017 | Bouaziz et al. |
| 10,430,642 B2 | 10/2019 | Bouaziz et al. |
| 2015/0243031 A1 | 8/2015 | Narasimha et al. |

OTHER PUBLICATIONS

Bpuaziz et al, Realtime Performance-Based Facial Animation, ACM Transaction on Graphics, Jul. 2011.*
Cootes, T., Baldock, E.R. and Graham, J., 2000. An introduction to active shape models. Image processing and analysis, 243657, pp. 223-248.*

* cited by examiner

GENERATING ANIMATED THREE-DIMENSIONAL MODELS FROM CAPTURED IMAGES

PRIORITY CLAIM

This application is a continuation of U.S. patent application Ser. No. 15/934,521, filed Mar. 23, 2018, now U.S. Pat. No. 10,430,642, which claims priority to U.S. Provisional Patent Application No. 62/595,920 entitled "GENERATING ANIMATED THREE-DIMENSIONAL MODELS FROM CAPTURED IMAGES", filed Dec. 7, 2017, each of which is incorporated by reference in its entirety.

BACKGROUND

1. Technical Field

Embodiments described herein relate to methods and systems for generating three-dimensional models of a user's face in captured images.

2. Description of Related Art

Motion capture has been used in a variety of areas to generate motion data that is based on tracking and recording the movements of real objects. For example, motion capture technology has been used frequently in video game production and movie production. Motion capture technology, however, has not been widely implemented at the consumer level. Consumer level motion capture systems have just begun to be implemented as processing and power advancements begin to allow consumer based electronics to more readily perform operations associated with motion capture.

SUMMARY

A three-dimensional model (e.g., motion capture model) of a user is generated from captured images or captured video of the user. A machine learning network is used to track poses and expressions of the user to generate the three-dimensional model from the capture images. The machine learning network may refine the three-dimensional model to provide a more accurate tracking of the user's face. Refining of the three-dimensional model may include defining selected locations in the model (e.g., eye corners, nose, etc.) and refining the determinations of poses and expressions based on the three-dimensional model being projected onto the captured images. The three-dimensional model may then be refined using the refined poses and expressions. The refining may occur in an iterative process. Tracking of the three-dimensional model over time (e.g., during video capture) may be used to generate an animated three-dimensional model of the user that simulates the user's poses and expressions.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
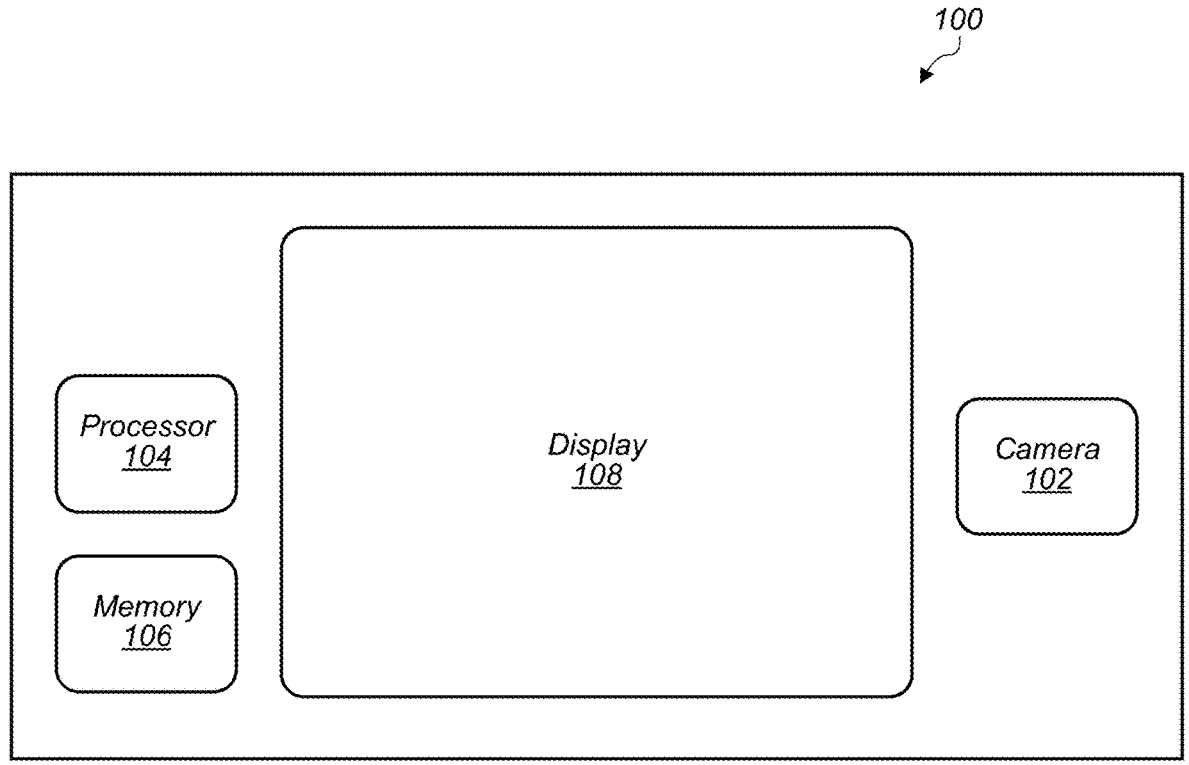
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
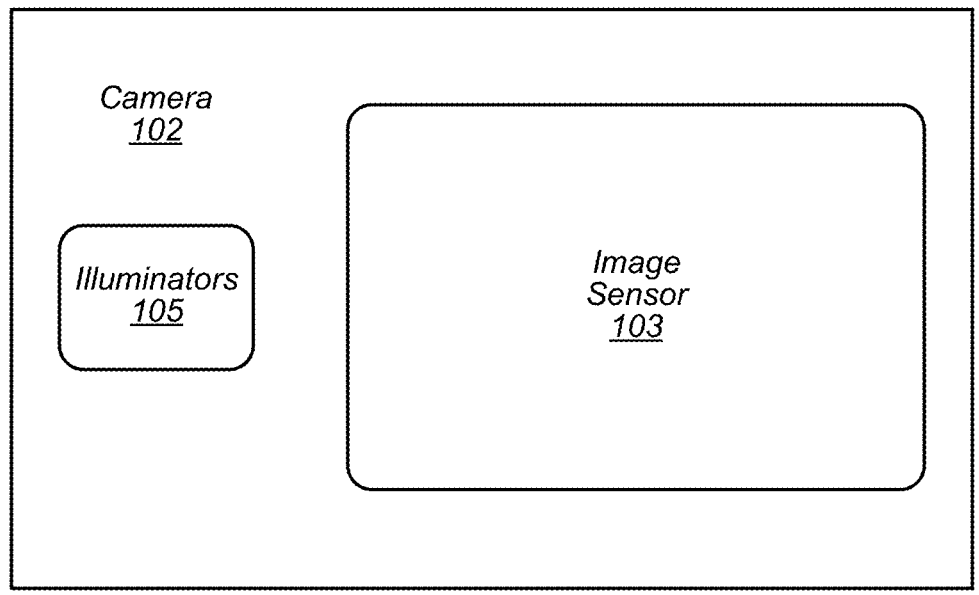
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR). In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator) and/or illuminators for infrared light (e.g., a flood IR source and/or a speckle pattern projector). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is used to capture a motion capture image of the user (e.g., an animated image of the user or a series of images showing motion of the user). In some embodiments, the image is captured using ambient illumination. In some embodiments, illuminators 105 may provide illumination to illuminate the subject and image sensor 103 may capture images of the illuminated subject. In certain embodiments, image sensor 103 captures visible (RGB) images of the user. In some embodiments, image sensor 103 captures IR images of the user (e.g., flood IR images and/or speckle pattern images). Flood IR illumination images may be, for example, two-dimensional images of the subject illuminated by IR light. Speckle pattern illumination may include illuminating a subject with a pattern of light spots (e.g., dots) with a known configuration and pattern projected onto the subject. Image sensor 103 may capture images of the subject illuminated by the speckle pattern. In some embodiments, the captured image of the speckle pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
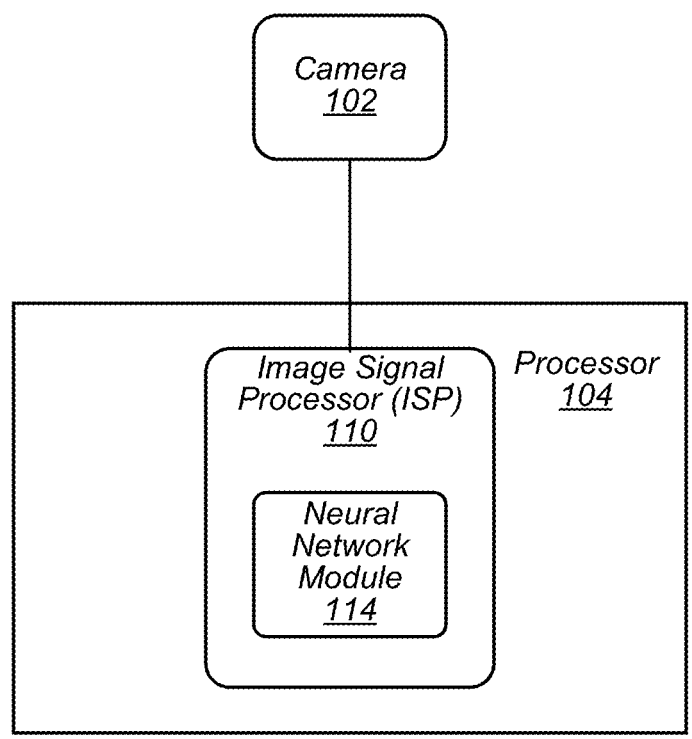
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network. In some embodiments, neural network module 114 is a convolutional neural network (CNN). Neural network module 114 may also be, for example, any trainable regressor network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

Figure 4:
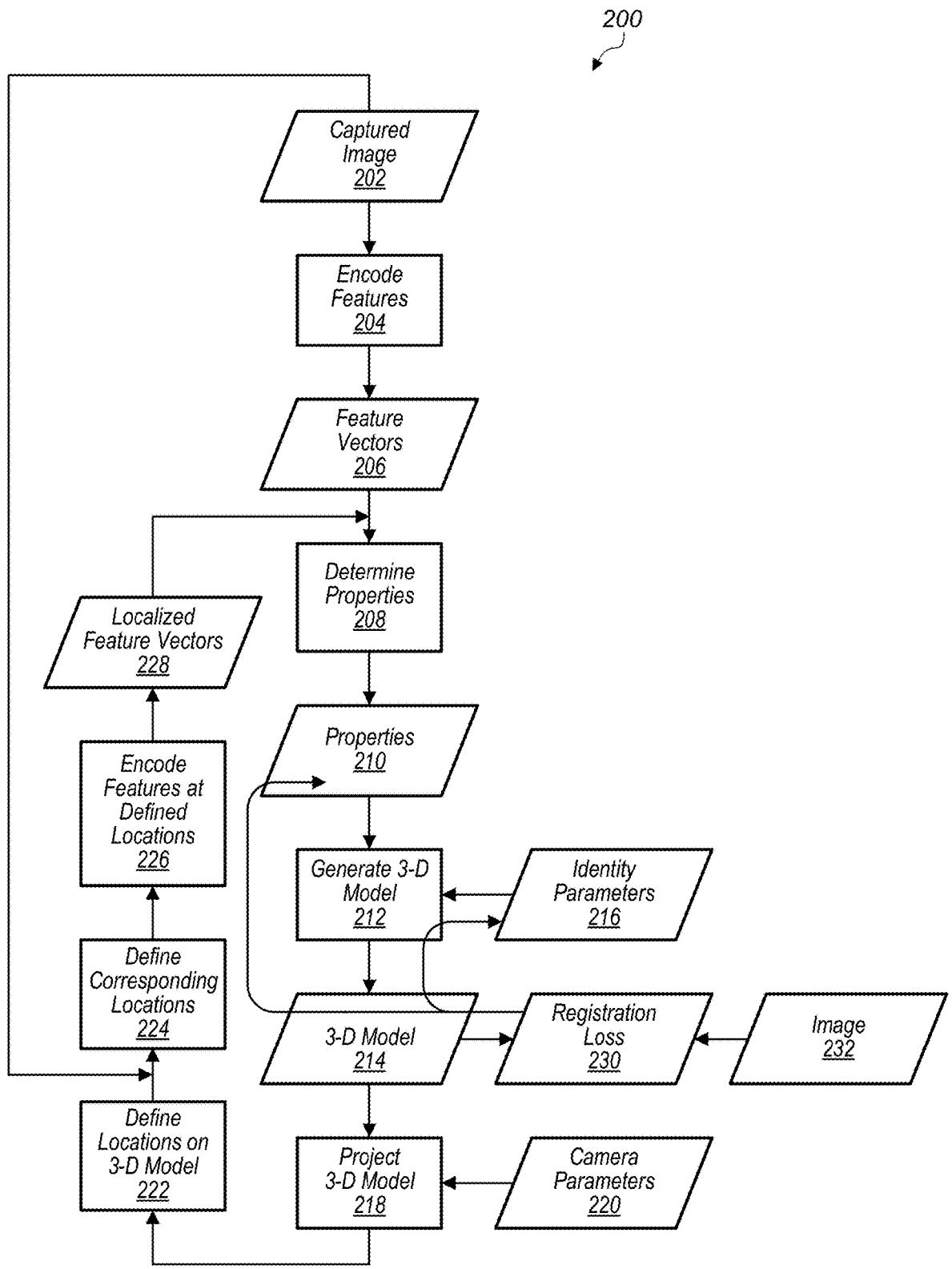
FIG. 4 depicts a flowchart of an embodiment of a process to generate a three-dimensional model from a captured image.

FIG. 4 depicts a flowchart of an embodiment of process 200. Process 200 may be used to generate a three-dimensional model of a user's face from an image captured by camera 102 on device 100. In certain embodiments, process 200 is used to process multiple images captured by camera 102 and generate an animated (or motion-captured) three-dimensional model of the user's face. For example, the multiple images may be images captured as video by camera 102 and/or other frame-by-frame or sequential images captured by the camera. In some embodiments, the multiple images are captured using camera 102 as the user interacts with device 100. For example, the multiple images may be captured as the user progresses through different motions and/or different poses. Further, the user may make different facial motions or movements and/or move his/her head while interacting with device 100 with the different motions and/or different poses being captured in successive images captured by camera 102 (e.g., images from video captured by the camera).

In certain embodiments, the captured images are individually processed by process 200 to generate a three-dimensional model for individual images (e.g., generate individual three-dimensional models corresponding to the individual images). The individual three-dimensional models may then be combined to generate the animated three-dimensional model. The animated three-dimensional model may be representative of the multiple images of the user captured by camera 102 (e.g., representative of the video of the user captured by the camera).

Process 200 may begin with captured image 202. Captured image 202 may be, for example, an RGB image or an IR image of the user captured by camera 102 on device 100. In certain embodiments, captured image 202 is an image (e.g., frame) from video captured by camera 102. In some embodiments, captured image 202 is an image captured from a sequence of images (e.g., a frame from a sequence of images).

In certain embodiments, the features of the user in captured image 202 are encoded in 204. Encoding of the captured image in 204 may include encoding features (e.g., facial features) of the user to define the features in the image as one or more feature vectors in a feature space. Feature vectors 206 may be the output of the encoding in 204. A feature space may be an n-dimensional feature space. A feature vector may be an n-dimensional vector of numerical values that define features from the image in the feature space (e.g., the feature vector may be a vector of numerical values that define facial features of the user in the image).

In certain embodiments, encoding of the captured image in 204 generates a high-level representation of captured image 202 with high-level feature vectors in the feature space. For example, encoding in 204 may generate a 64×64 grid representation of the user's face with a feature vector in each region (cell) of the grid whereas the captured image may have a higher resolution (e.g., captured image 202 may be a 256×256 image). In some embodiments, encoding of the captured image in 204 is operated over each pixel in the image (e.g., over each pixel of the 256×256 image).

In 208, feature vectors 206 may be used to determine properties 210 of the face of the user. In certain embodiments, properties 210, determined in 208, include a pose of the face of the user and one or more muscle activations of the face of the user. Pose of the face may include pitch, yaw, and roll of the face. Muscle activations may include movements of different (individual) muscles or muscle sets in the user's face. Movement (activation) of each individual muscle/muscle set may produce some local deformation in the user's face in the image. The combination of local deformations may provide an expression for the user's face in the image.

Figure 5:
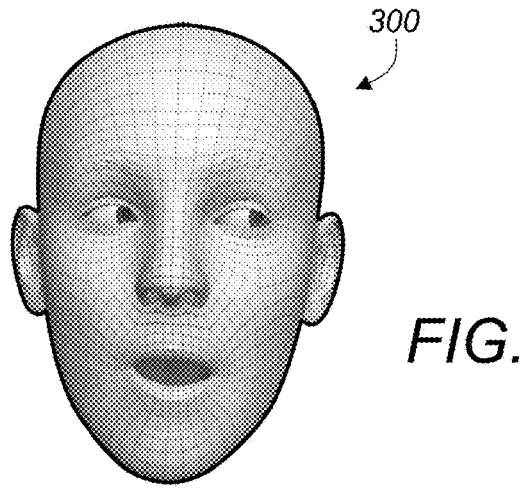
FIG. 5 depicts a representation of a model of a user's face.

FIG. 5 depicts a representation of model 300 of a user's face. In some embodiments, model 300 is a blendshape model of the user's face. Model 300 includes a selected number of muscle sets (e.g., blendshapes). The muscle sets may be defined for different muscle movements of the user's face such as, but not limited to, eyebrow movement up or down, cheek squint, chin lower or raising, eye blink, eye movement up or down, eye movement in or out, eye open or closed, eye squint, jaw left or right, jaw open or closed, lips opened or closed, lip pucker, lip stretch, mouth frown, and mouth smile. Movement (e.g., deformation) of these muscle sets may individually, or in combination, produce local deformations of the user's face. Thus, localized movements (deformations) of the user's face and the expression for the user's face in the image may be determined by assessing the deformations of the muscle sets in the captured image.

In certain embodiments, determining properties 210 in 208, shown in FIG. 4, includes performing a regression on feature vectors 206 to determine the properties of the user's face. After properties 210 are determined, in 212, the properties may be used to generate a three-dimensional model 214 of the user's face. Three-dimensional model 214 may be, for example, a three-dimensional reconstruction or three-dimensional reconstruction mesh of the user's face based on properties 210 for the user's face.

In certain embodiments, identity parameters 216 are used in 212 to generate three-dimensional model 214. Identity parameters 216 may include, for example, parameters that define a neutral face structure (e.g., face geometry) for the user associated with the captured image (e.g., captured image 202). The neutral face structure may be, for example, when the face has no expression (e.g., when the face has no facial movements or deformations or when the face is resting). Using identity parameters 216 in 212 to generate three-dimensional model 214 may provide the parameters for the neutral face structure that allow the three-dimensional model to show changes in facial geometry (as defined by the muscle activations) from the neutral face structure.

Figure 6:
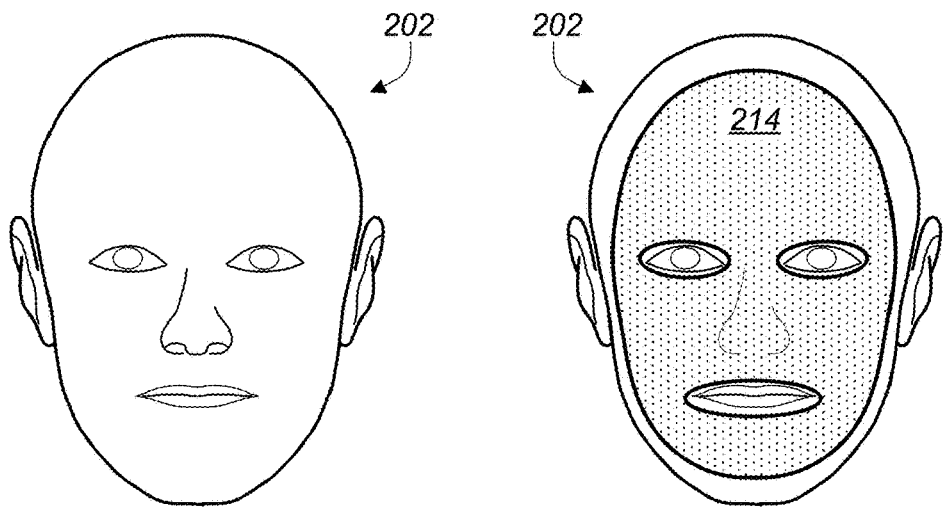
FIG. 6 depicts a side-by-side representation of an example captured image and an example three-dimensional model projected onto the example captured image.

In 218, three-dimensional model 214 may be projected onto the captured image (e.g., captured image 202). FIG. 6 depicts a side-by-side representation of an example captured image 202 and an example three-dimensional model 214 projected onto the example captured image. In certain embodiments, camera parameters 220, shown in FIG. 4, are used to align the projection of three-dimensional model 214 onto captured image 202. Camera parameters 220 may include, for example, optical parameters of camera 102 and/or image processing parameters associated with the camera.

In certain embodiments, as shown in FIG. 4, after 218, selected locations for features may be defined on three-dimensional model 214 in 222. The selected locations may be, for example, localized locations of interest on three-dimensional model 214. Examples of localized locations of interest include, but are not limited to, mouth corners, eye corners, and dimples. Thus, the selected locations may be locations of interest as defined by three-dimensional model 214. These selected locations may then be used to define corresponding locations on captured image 202 in 224. The corresponding locations may be based on the projection of three-dimensional model 214 on captured image 202 determined in 218.

After the corresponding locations are defined in 224, captured image 202 may be encoded in 226 to extract "localized" feature vectors 228 for the corresponding locations (e.g., the selected locations as defined by three-dimensional model 214). Localized feature vectors 228 may then be used to update properties 210 (e.g., head pose and muscle activations) determined in 208. Updating properties 210 with localized feature vectors 228 may refine the estimation (e.g., determination) of the properties and provide more accurate estimation of the properties for captured image 202.

In certain embodiments, refinement of properties 210 using localized feature vectors 228 determined from three-dimensional model 214 is repeated. For example, the refined properties 210 may be used to produce a second three-dimensional model 214, which is then used to determine a second set of localized feature vectors 228, which are then used to further update (refine) properties 210. The further refined properties 210 may then be used to further update (refine) three-dimensional model 214. Refinement of three-dimensional model 214 using localized feature vectors 228 may provide spatial and temporal refinement of the three-dimensional model. The refinement process may be repeated (e.g., iterated) a selected number of times. In some embodiments, the number of times for iteration of the refinement is selected based on the frame rate of camera 102 and a speed of process 200.

As described above, identity parameters 216 may define a neutral face structure for the user in captured image 202. As identity parameters 216 are for the particular user in captured image 202, a set of identity parameters may be used for multiple images of the particular user processed by process 200. In certain embodiments, as shown in FIG. 4, three-dimensional model 214 is used to update identity parameters 216 as captured image 202 is process by process 200 on device 100.

For the identity parameters update, registration loss 230 between three-dimensional model 214 and image 232 may be defined. Registration loss 230 may be, for example, an assessment of the distance between similar points in three-dimensional model 214 and image 232 when the three-dimensional model is projected onto the image with registration loss being higher the further distance between the points. Registration loss 230 may also include, but not be limited to, differences in color consistency and/or optical flow between three-dimensional model 214 and image 232. Image 232 may be, for example, a depth map image of the user obtained by camera 102 when the user is illuminated with speckle pattern illumination as described herein and/or a color image of the user. In some embodiments, image 232 includes any three-dimensional image captured of the user.

Registration loss 230 may be backpropagated into three-dimensional model 214 to refine (e.g., optimize) identity parameters 216, as shown in FIG. 4. Refinement of identity parameters 216 using the backpropagation may minimize registration loss 230. Backpropagation and refinement (optimization) of identity parameters 216 may include, for example, stochastic gradient descent, conjugate gradient, BFGS (Broyden-Fletcher-Goldfarb-Shanno) algorithm, L-BFGS (limited-memory BFGS) algorithm, Gauss-Newton algorithm, and/or Levenbarg-Marquardt algorithm.

In some embodiments, refinement of identity parameters 216 operates at a lower frame rate than generation of three-dimensional model 214. For example, identity parameters 216 may be refined at a frame rate based on the frame capture rate of depth map image 232. Using the lower frame rate for refinement of identity parameters 216 may reduce power consumption by device 100 and improve battery life. Refinement of identity parameters 216 used in process 200 may provide increase accuracy in defining the neutral face structure used for three-dimensional model 214. With increased accuracy in defining the neutral face structure, tracking (determination) of pose and expression (e.g., muscle activation) in captured image 202 for three-dimensional model 214 may be improved.

In some embodiments, registration loss 230 may be used to refine other properties used to generate three-dimensional model 214. For example, registration loss 230 may be used to refine properties 210 (e.g., the pose and/or muscle activations) determined in 208 of process 200. In some embodiments, identity parameters 216 may be determined in 208 as one of properties 210 (e.g., performing a regression on feature vectors 206 determines the identity parameters in addition to the pose and muscle activations). In such embodiments, registration loss 230 may be used to refine each of the properties 210 determined in 208 of process 200.

Figure 7:
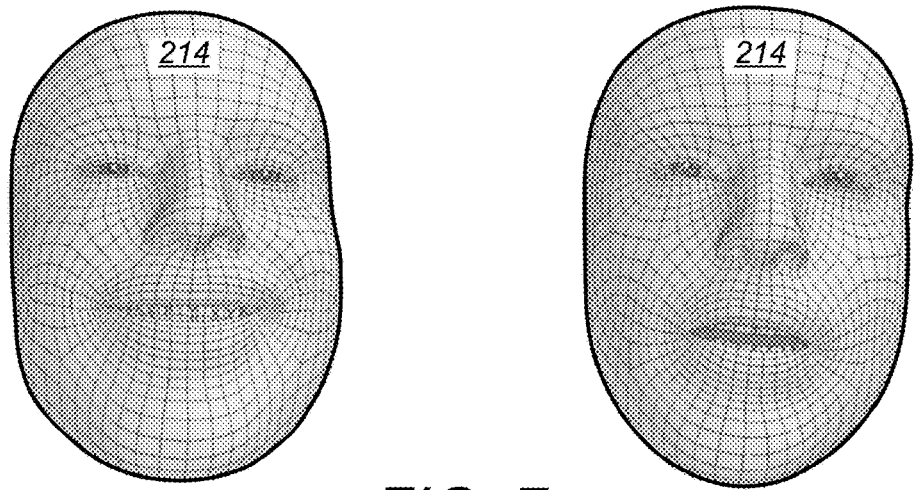
FIG. 7 depicts an example of two three-dimensional models of a user with different poses and expressions in each of the models.

As described above, captured image 202 may be one of multiple captured images processed by process 200. In some embodiments, the user has different poses and/or expressions (e.g., muscle activations) in one or more of the captured images. In such embodiments, three-dimensional models 214 generated from the captured images represent the different poses and/or expressions. For example, FIG. 7 depicts an example of two three-dimensional models of a user with different poses and expressions in each of the models.

In certain embodiments, individual three-dimensional models 214 may be generated for captured images and the three-dimensional models may be combined to provide an animated three-dimensional model of the user. For example, multiple images may be part of a video captured of the user. Thus, individual three-dimensional models for successive (e.g., sequential) images in the video captured may be combined to generate an animated three-dimensional model that simulates the poses and facial movements (e.g., muscle activations) of the user in the video. The animated three-dimensional model may be displayed, for example, on display 108 of the device. In some embodiments, the animated three-dimensional model may be generated and displayed on display 108 in "real-time" (e.g., the animated three-dimensional model is displayed substantially simultaneously with video capture). In some embodiments, three-dimensional model(s) 214 and/or the animated three-dimensional model are stored in memory 106 of device 100.

In some embodiments, three-dimensional model(s) 214 and/or the animated three-dimensional model are used in a simulation of the user. For example, animated puppets (e.g., animated emojis) or other animated images or characters may simulate the poses and/or expressions of the user based on the animated three-dimensional model of the user. In some embodiments, the simulation may include other movements that are based off movements of the user in the animated three-dimensional model. For example, smiling of the user in the animated three-dimensional model may trigger another movement in the simulation such as ear movement.

In certain embodiments, as described herein, process 200 is operated using neural network module 114. Neural network module 114 may be trained to perform process 200 from end-to-end using a plurality of training images. For example, a training image may be used to train process 200 to generate three-dimensional model 214 for the training image and to refine the three-dimensional model using localized feature vectors 228.

In some embodiments, temporal and spatial smoothing may be operated on three-dimensional model 214 generated by process 200. Temporal and spatial smoothing may include, for example, using a temporal and spatial smoothness regularizer. In some embodiments, stretching and bending terms are used in the temporal and spatial smoothing.

In certain embodiments, one or more process steps described herein may be performed by one or more processors (e.g., a computer processor) executing instructions stored on a non-transitory computer-readable medium. For example, process 200, shown in FIG. 4, may have one or more steps performed by one or more processors executing instructions stored as program instructions in a computer readable storage medium (e.g., a non-transitory computer readable storage medium).

Figure 8:
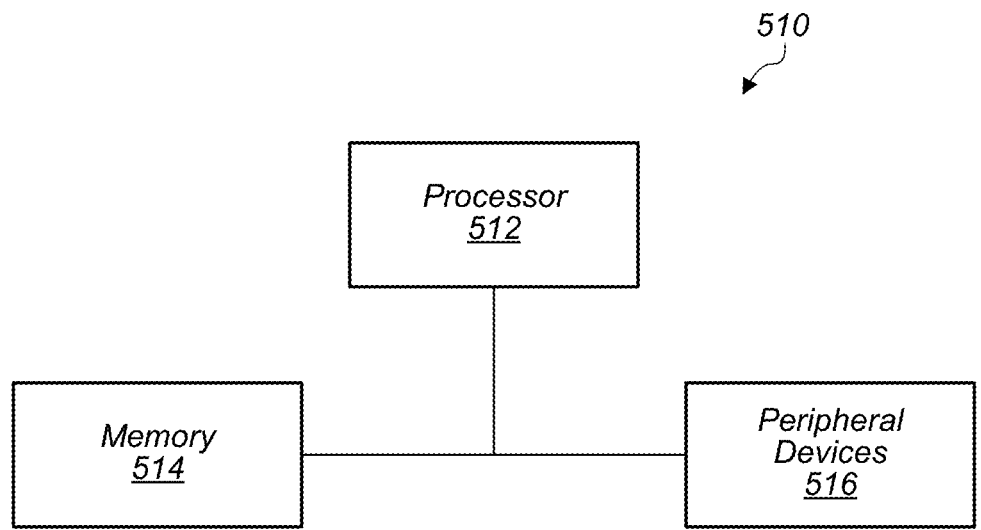
FIG. 8 depicts a block diagram of one embodiment of an exemplary computer system.

FIG. 8 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, shown in FIG. 4. In the embodiment of FIG. 8, computer system 510 includes processor 512, memory 514, and various peripheral devices 516. Processor 512 is coupled to memory 514 and peripheral devices 516. Processor 512 is configured to execute instructions, including the instructions for process 200, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 9:
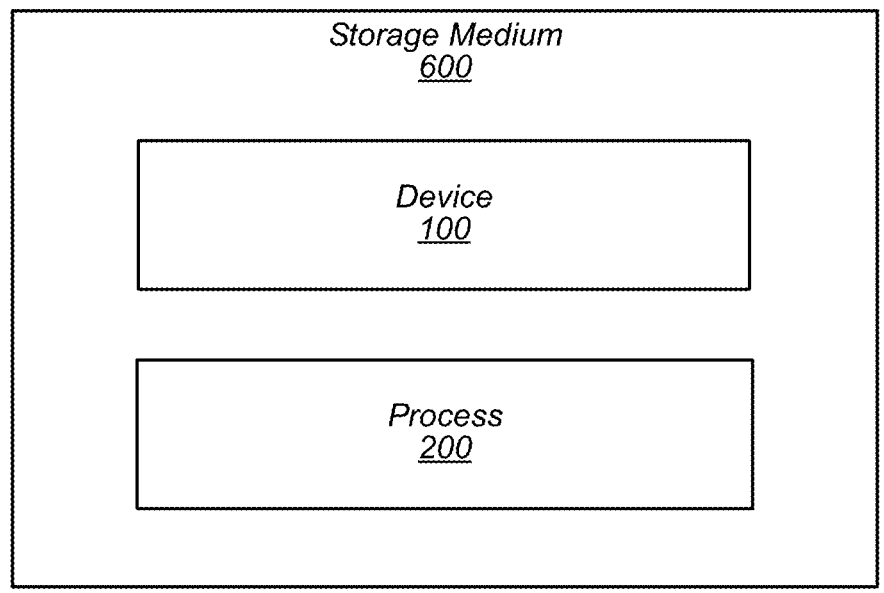
FIG. 9 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 9, other input/output (I/O) devices such as video hardware, audio hardware, user interface devices, networking hardware, etc.).

Turning now to FIG. 9, a block diagram of one embodiment of computer accessible storage medium 600 including one or more data structures representative of device 100 (depicted in FIG. 1) included in an integrated circuit design and one or more code sequences representative of process 200 (shown in FIG. 4). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
    obtaining at least one image of a face of a user using a camera located on a device, the device comprising a computer processor, a memory, and a display;
    generating one or more first feature vectors from the at least one image, wherein the first feature vectors represent one or more facial features of the face in the at least one image;
    determining a pose of the face of the user and one or more muscle activations of the face in the at least one image based on the first feature vectors;
    generating a three-dimensional model of the user's face based on the pose and muscle activations of the face determined from the first feature vectors;
    defining one or more localized locations of interest on the three-dimensional model of the user's face;
    for each of the one or more localized locations of interest, generating one or more second feature vectors from the at least one image, wherein the second feature vectors are generated at locations in the at least one image that correspond to the localized locations of interest on the three-dimensional model of the user's face based on a projection of the three-dimensional model onto the at least one image; and
    refining, at least once, the generated three-dimensional model of the user's face by refining pose and muscle activations for the face using the second feature vectors.

2. The method of claim 1, further comprising displaying a representation of the three-dimensional model on the display.

3. The method of claim 1, further comprising:
    generating and refining three-dimensional models for a plurality of images of the face of the user obtained using the camera;
    generating an animated three-dimensional model of the user's face based on the refined three-dimensional models generated for the plurality of images; and
    displaying a representation of the animated three-dimensional model on the display.

4. The method of claim 3, wherein displaying the representation of the animated three-dimensional model on the display includes displaying a simulation of motion of the user's face in the plurality of images.

5. The method of claim 1, wherein determining the pose and muscle activations comprises performing regression on the feature vectors.

6. The method of claim 1, wherein the three-dimensional model is projected onto the at least one image based on parameters of the camera.

7. The method of claim 1, wherein the refining of the pose and muscle activations for the face using the second feature vectors is repeated a selected number of times.

8. The method of claim 1, further comprising:
    assessing a registration loss in the at least one image;
    determining one or more identity parameters for the face in the at least one image, wherein the identity parameters minimize the assessed registration loss; and
    wherein the three-dimensional model of the face is generated based on the determined pose and muscle activations from the first feature vectors in combination with the determined identity parameters.

9. The method of claim 8, further comprising refining the pose and muscle activations of the face determined from the first feature vectors by backpropagating the registration loss into the three-dimensional model.

10. A device, comprising:
    a camera;
    a display; and
    circuitry coupled to the camera and the display, wherein the circuitry is configured to:
        obtain a plurality of images of a face of a user using the camera;
        generate one or more first feature vectors from at least one image in the plurality of obtained images, wherein the first feature vectors represent one or more facial features of the face in the at least one image;
        determine a pose of the face of the user and one or more muscle activations of the face in the at least one image based on the first feature vectors;
        generate a three-dimensional model of the user's face based on the pose and muscle activations of the face determined from the first feature vectors;
        define one or more localized locations of interest on the three-dimensional model of the user's face;
        for each of the one or more localized locations of interest, generate one or more second feature vectors from the at least one image, wherein the second feature vectors are generated at locations in the at least one image that correspond to the localized locations of interest on the three-dimensional model of the user's face based on a projection of the three-dimensional model onto the at least one image;
        refine, at least once, the generated three-dimensional model of the user's face by refining pose and muscle activations for the face using the second feature vectors; and display a representation of the three-dimensional model on the display.

11. The device of claim 10, wherein the circuitry is configured to:
generate and refine a three-dimensional model for at least one additional image in the plurality of obtained images;
generate an animated three-dimensional model of the face of the user based on the refined three-dimensional models generated for the at least one image and the at least one additional image; and
display a representation of the animated three-dimensional model on the display.

12. The device of claim 11, wherein the representation of the animated three-dimensional model displayed on the display includes a simulation of poses and facial movements of the user's face in the at least one image and the at least one additional image.

13. The device of claim 11, wherein the representation of the animated three-dimensional model displayed on the display includes an animated puppet generated from the animated three-dimensional model of the user's face.

14. The device of claim 10, wherein the circuitry is configured to obtain the plurality of images of the face of the user by capturing images from a video of the user's face obtained using the camera.

15. The device of claim 10, wherein the circuitry is configured to display the representation of the three-dimensional model on the display in response to an input by the user on the device.

16. A non-transitory computer-readable medium having instructions stored thereon that are executable by a computing device to perform operations, comprising:
obtaining at least one image of a face of a user using a camera located on the computing device;
generating one or more first feature vectors from the at least one image, wherein the first feature vectors represent one or more facial features of the face in the at least one image;
determining a pose of the face of the user and one or more muscle activations of the face in the at least one image based on the first feature vectors;
generating a three-dimensional model of the user's face based on the pose and muscle activations of the face determined from the first feature vectors;
defining one or more localized locations of interest on the three-dimensional model of the user's face;
for each of the one or more localized locations of interest, generating one or more second feature vectors from the at least one image, wherein the second feature vectors are generated at locations in the at least one image that correspond to the localized locations of interest on the three-dimensional model of the user's face based on a projection of the three-dimensional model onto the at least one image; and
refining, at least once, the generated three-dimensional model of the user's face by refining pose and muscle activations for the face using the second feature vectors.

17. The non-transitory computer-readable medium of claim 16, further comprising displaying a representation of the three-dimensional model on a display of the computing device.

18. The non-transitory computer-readable medium of claim 16, further comprising:
generating and refining three-dimensional models for a plurality of images of the face of the user obtained using the camera;
generating an animated three-dimensional model of the user's face based on the refined three-dimensional models generated for the plurality of images; and
displaying a representation of the animated three-dimensional model on a display of the computing device.

19. The non-transitory computer-readable medium of claim 18, wherein displaying the representation of the animated three-dimensional model on the display includes displaying a simulation of poses and facial movements of the user's face in the plurality of images.

20. The non-transitory computer-readable medium of claim 18, wherein displaying the representation of the animated three-dimensional model on the display includes displaying an animated puppet generated from the animated three-dimensional model of the user's face.

* * * * *